United States Patent [19]

Sieber-Gadient

[11] Patent Number: 4,702,948
[45] Date of Patent: Oct. 27, 1987

[54] SELF-ADHESIVE TAPE WITH TWO-SIDED CONTACT ADHESIVE COATING AND METHOD OF PRODUCING THE SAME

[76] Inventor: Paul Sieber-Gadient, Felsbergstrasse 6, 6006 Luzern, Switzerland

[21] Appl. No.: 804,824

[22] Filed: Dec. 5, 1985

Related U.S. Application Data

[63] Continuation of Ser. No. 531,241, Sep. 12, 1983, abandoned.

[51] Int. Cl.$^4$ .............................................. B05D 3/06
[52] U.S. Cl. .................................. 428/40; 427/208; 425/161; 425/172; 425/175; 425/212; 428/213; 428/246; 428/343; 428/354
[58] Field of Search ............... 427/208; 428/161, 172, 428/212, 213, 246, 354, 175, 40, 343

[56] References Cited

U.S. PATENT DOCUMENTS 2,732,065  1/1956  Marchese ............................ 427/208
3,711,349  1/1973  Snyder et al. ....................... 428/62

FOREIGN PATENT DOCUMENTS 72393  1/1973  Australia ............................ 428/354

Primary Examiner—John E. Kittle
Assistant Examiner—P. R. Schwartz

[57] ABSTRACT

The self-adhesive tape has two sides, one of which forms a bottom side at which a supporting or carrier fabric is only superficially covered by a contact adhesive coating. At the other side, which forms the top side, a contact adhesive coating uniformly covers the supporting or carrier fabric so as to essentially form a plane which uninterruptedly engages a separating paper layer. Due to the crossing or intersection points formed by warp and weft threads of the supporting fabric such supporting fabric produces unevenness only at the bottom side, resulting in a smaller adhesive capability or action of the lower contact adhesive coating as compared to the adhesive capability or action of the upper contact adhesive coating uniformly engaging the separating paper layer. Through the apertures or openings formed in the supporting fabric these adhesive layers are interconnected which promotes the non-separability of the self-adhesive tape as a whole. The self-adhesive tape thus can be employed in such a way that it can be again detached and this is achieved by associating the bottom side thereof with a surface such as a floor and the top side thereof, for example, with a structure to be supported on the surface, such as a carpet.

7 Claims, 1 Drawing Figure

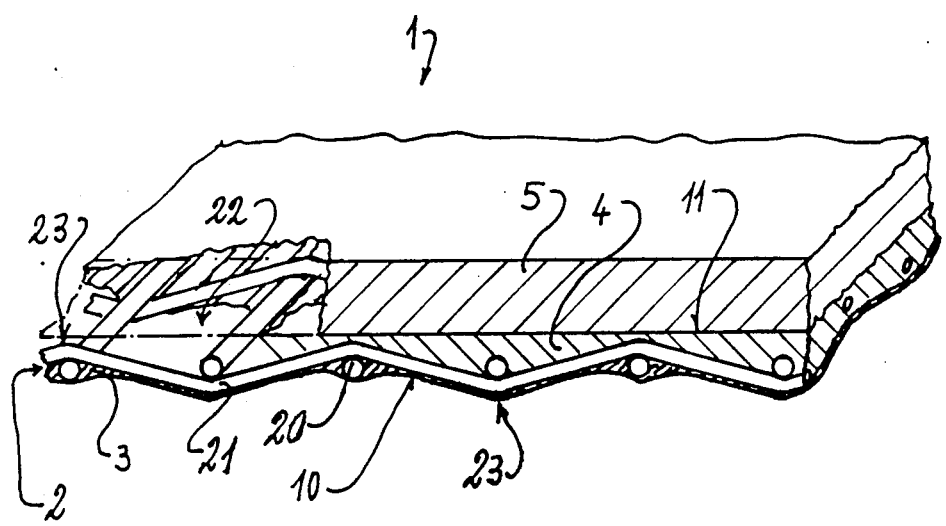

SELF-ADHESIVE TAPE WITH TWO-SIDED CONTACT ADHESIVE COATING AND METHOD OF PRODUCING THE SAME

CROSS-REFERENCE TO RELATED APPLICATION

This application is a continuation application of my U.S. patent application Ser. No. 06/531,241 filed Sept. 12, 1983 now abandoned, and entitled: SELF-ADHESIVE TAPE WITH TWO-SIDED CONTACT ADHESIVE COATING AND METHOD OF PRODUCING THE SAME.

BACKGROUND OF THE INVENTION

The present invention generally relates to a new and improved self-adhesive tape and to a new and improved method of producing the same.

In its more specific aspects the present invention relates to a new and improved double-sided bonding self-adhesive tape which is especially suitable for, preferably full-area, carpeting of floors and covering of walls in such a manner as to be able to again remove or take-up the carpets or coverings or the like.

In the context of this disclosure the term "tape" is used in a broader sense as not only relating to tapes or bands as such but also to sheets or sheet-like structures.

Self-adhesive tapes of the aforementioned type are known, for example, as carpet or covering-laying tapes and frequently serve to mount floor or wall coverings.

The known self-adhesive tapes have the disadvantage that, while originally they have a sufficient adhesive capability or action, they can only poorly or, in fact, only with damage to the covering or the substratum again be detached. With certain formulations or compositions of the adhesive, it may also happen that the contact adhesive loses its original state or form due to environmental effects and/or aging and degenerates into a syrupy or tacky substance or into a brittle structure. In such case the contact adhesive no longer fulfills its intended function.

SUMMARY OF THE INVENTION

Therefore, with the foregoing in mind, it is a primary object of the present invention to provide a new and improved double-sided bonding self-adhesive tape or the like which is not afflicted with the aforementioned drawbacks and limitations heretofore discussed.

Another and more specific object of the present invention is directed to the provision of a new and improved self-adhesive tape which permits the relevant structure covering or which is intended to be releasably secured to a surface to be again removed from the surface such as a base or substratum without damage thereto.

Still a further significant object of the present invention is directed to a new and improved self-adhesive tape which permits the covering to be taken-up from its base or the like without damage thereto and to be re-used as often as possible.

Another significant object of the present invention is directed to the provision of an improved and economical double-sided bonding self-adhesive tape and a method of manufacturing the same.

Now in order to implement these and still further objects of the invention, which will become more readily apparent as the description proceeds, the double-sided bonding self-adhesive tape of the present development is manifested by the features that, the two sides of the self-adhesive tape have different adhesive capabilities or actions. To achieve this desirable effect the double-sided bonding self-adhesive tape comprises a non-cleavable or non-splitable supporting or carrier layer, particularly a substantially non-stretchable or stretch-resistant grid-like supporting fabric which possesses throughpassing apertures or openings. At both sides or faces of this supporting fabric there is provided a respective essentially continuous self-adhesive layer or contact adhesive coating. One of these two self-adhesive layers possesses an outer substantially planar or flat adhesive surface. The other self-adhesive layer is non-planar and possesses a structured outer adhesive surface, i.e. an outer adhesive surface which follows the structure of the neighboring face or side of the supporting fabric. Both of the continuous self-adhesive layers or adhesive coatings are interconnected with one another through the throughpassing apertures or openings. Each self-adhesive layer or adhesive coating is essentially aging-resistant and resistant to softeners.

The different adhesive capabilities of the two tape sides or faces permits the one or the other side of the double-sided bonding self-adhesive tape to be intentionally arranged so as to face, for example, the floor and/or the floor covering, whereby the detachment thereof can be beneficially controlled.

It is of an advantage that there can be used a non-cleavable or non-separable, only slightly stretchable or elongatable woven supporting fabric, since the self-adhesive tape thus can be maintained in an undivided or unsplit state during the laying operation and during eventual take-up of the laid covering and tape. Additionally, the small stretchability prevents the self-adhesive tape from distortion when it is laid, used and taken-up.

When a loose fabric containing openings or apertures is employed as the supporting or carrier fabric a mutual interconnection or bonding of the contact adhesive coatings on the two sides thereof can occur through the apertures, which can beneficially enhance the undivided take-up of the tape.

While different adhesive capabilities or actions may be achieved by using different adhesives on the two sides of the tape, the consequence thereof is that there may arise possibly different resistances to, for example, aging and the effects of softening agents or plasticizers.

When the differences in the adhesive capability are preferably created by structural differences between the two sides of the self-adhesive tape, the same and thus possibly an ideal adhesive can be used on both tape sides, so that there does not have to exist any restrictions in respect of the differences in the adhesive capability due to the adhesive formula or composition.

In a preferred manner the structural difference can be obtained by differently covering the unevenness or irregularities of the supporting or carrier fabric by the contact adhesive coatings. Advantageously, the better adhering side may be entirely planar or flat while the other side may be relatively uneven or irregular.

Preferably, the supporting or carrier fabric can be arranged outside of the median plane of the self-adhesive tape as seen in cross-section.

It is just these very structural differences which permit the same contact adhesive to be provided on both of the two tape sides. Preferably, an adhesive may be employed which is resistant to aging and affected as little as possible by softeners or plasticizers. Thus, an acrylic adhesive composition is especially suitable since such adhesives can be appropriately prepared.

Preferably, the inventive self-adhesive tape can be marketed while it releasably adheres to a separating layer, preferably constituted by a separating paper layer, the paper of which is silicone-treated in a manner known as such. The more adhesive side may engage practically without any interruptions or gaps the separating paper, while the other side is of uneven design, and thus, is also less adherent when the self-adhesive tape is rolled-up. Thus, a faulty detachment need not be feared during unrolling, without any further measures having to be undertaken for this purpose.

As alluded to above the invention is not only concerned with the aforementioned inventive self-adhesive tape, but also relates to a novel method of producing the same. Generally speaking, the inventive method relates to the production of a self-adhesive tape in which the contact adhesive coating possessing the higher adhesive capability or action at least largely uninterruptedly and detachably engages a separating paper layer.

To achieve the aforementioned measures the inventive method of producing a self-adhesive tape comprises the steps of applying a contact adhesive coating to a separating layer, attaching a supporting fabric to the contact adhesive coating applied to the separating layer, and covering the supporting fabric on the side thereof which is remote from the contact adhesive coating with a further adhesive coating which at most incompletely levels or evens out the structure of the supporting fabric.

It will be recognized that when practicing the inventive method the objects of the invention can be realized by a simple choice of coating thicknesses and the sequence in which the layers are formed. Therefore, conventional machines and materials can be used for this purpose.

The contact adhesive coating according to the invention may be employed for laying a floor covering, for example, a carpet which can be again detached or taken-up. The procedure therefor defining the surface at which the carpet may be releasably secured, is as follows: the entire floor or at least a part thereof is covered by the double-sided bonding self-adhesive tape. During this operation the tape side of less adhesive capability or power is downwardly directed towards the floor, while the side of higher adhesive capability or power which is covered by a separating paper is placed on top. The carpet now may be provisionally laid and, if need be, may be cut. The carpet is then partially folded-back, part of the separating paper is withdrawn, and then the carpet is folded-back into its original position and applied to that side of the self-adhesive tape which has the higher adhesive capability. If necessary, the carpet is firmly pressed against the tape. Now the rest of the carpet is folded-back, the remaining separating paper is withdrawn, and then the part of the carpet which has just been folded-back is returned into its prior position and pressed against the self-adhesive tape after the separating paper has been removed therefrom. The laying operation is then finished. If the carpet is upwardly pulled then the self-adhesive tape separates from the floor and remains adhering to the carpet. The carpet may be protected by a plastic foil prior to rolling-up the same, so that the carpet which already carries a self-adhesive layer or tape, can be reused.

BRIEF DESCRIPTION OF THE DRAWINGS

The invention will be better understood and objects other than those set forth above, will become apparent when consideration is given to the following detailed description thereof. Such description makes reference to the annexed drawing wherein the single figure shows a schematic perspective view of a double-sided bonding self-adhesive tape or the like constructed according to the present invention.

DETAILED DESCRIPTION OF THE PREFERRED EMBODIMENTS

Turning attention now to the drawing, there will be recognized part of a supporting or carrier layer, here shown in form of a woven supporting or carrier fabric 2 which may be formed from twenty warp threads 20 running in longitudinal direction and nine filling or weft threads 21 running in transverse direction per centimeter and with the yarns or threads thereof having a metric yarn number in the range of 60 to 70 and provided in a linen or plane weave. Pairs of warp threads 20 can be arranged closer together to increase slip-resistance. The woven supporting or carrier fabric 2 thus constitutes a non-cleavable or non-splitable substantially stretch-resistant grid-like structure. Advantageously, there are used yarns formed of staple fibers which offer a good hold or retention for the adhesive due to their rougher surface.

Regenerated cellulose or rayon stable has been found to be mechanically and chemically as well as economically advantageous.

As a contact adhesive an acrylate dispersion enriched with tackifying resins and containing ultraviolet-and aging-protective agents has proven to be advantageous, and there also can be achieved an insensitivity to softeners or plasticizers.

The drawing shows part of the inventive double-sided bonding self-adhesive tape 1 which has two sides or faces, one of which forms a bottom side or face 10 and the other one of which forms a top side or face 11. The self-adhesive tape 1 contains on the bottom side 10 thereof an essentially continuous contact adhesive coating or layer 3 which only superficially covers the woven supporting or carrier fabric 2. This contact adhesive coating or layer 3 constitutes a non-planar adhesive surface which is structured and which follows the structure of the supporting or carrier fabric 2. On the top side 11 the self-adhesive tape 1 also contains an essentially continuous contact adhesive coating 4 which totally evens or levels-out the irregularity or unevenness in the structure of the supporting or carrier fabric 2. This contact adhesive coating or layer 4 defines an outer substantially planar or flat adhesive surface. The contact adhesive coating 4 totally engages at the top side 11 with a separating layer 5 thus defining an outer separating layer which, in the illustrated exemplary embodiment, comprises silicone-treated paper.

The two contact adhesive coatings or layers 3 and 4 are mutually connected with one another through the throughpassing apertures or openings 22 which remain free between the warp threads 20 and the filling or weft threads 21 of the supporting or carrier fabric 2.

It will be recognized that the unevenness in the structure of the woven supporting fabric 2, which defines a loosely set fabric, can be emphasized by the crossing or intersection of the warp threads 20 and the weft threads 21 as well as by the throughpassing apertures or openings 22.

The tape bottom side 10 thus engages a largely planar base only at the region of the intersections 23 of the warp threads 20 and weft threads 21, and thus, only adheres thereto at this location, which explains the differences in adhesive capability or power.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A double-sided bonding self-adhesive tape comprising:
    a non-cleavable substantially stretch-resistant grid-like woven supporting fabric defining two sides;
    said non-cleavable substantially stretch-resistant grid-like woven supporting fabric possessing throughpassing apertures;
    contact adhesive means;
    said contact adhesive means being arranged on both of said two sides of said non-cleavable substantially stretch-resistant grid-like woven supporting fabric;
    said contact adhesive means arranged on one of said two sides of said non-cleavable substantially stretch-resistant grid-like woven supporting fabric defining a substantially continuous self-adhesive coating possessing an outer substantially planar adhesive surface;
    said contact adhesive means arranged on the other one of said two sides of said non-cleavable substantially stretch-resistant grid-like woven supporting fabric defining a substantially continuous self-adhesive coating possessing an outer substantially non-planar structured adhesive surface which followa the structure of the non-cleavable substantially stretch-resistant grid-like woven supporting fabric;
    said two adhesive surfaces of said contact adhesive means being interconnected with one another through said throughpassing apertures of said woven supporting fabric;
    one of the two sides of said double-sided bonding self-adhesive tape having a different surface structure and thus inherently possessing a different adhesive capability than the other one of the two sides of said double-sided bonding self-adhesive tape;
    said one of said two sides of said double-sided bonding self-adhesive tape having said different surface structure and inherently possessing said different adhesive capability possessing a greater adhesive capability than said other one of said two sides and defining a top side of the double-sided bonding self-adhesive tape to enable said one side defining said top side to be securely attached to a structure intended to be releasably connected to a supporting surface by means of said double-sided bonding self-adhesive tape;
    said other one of said two sides of said double-sided bonding self-adhesive tape possessing a lesser adhesive capability than said one side defining said top side of said double-sided bonding self-adhesive tape and being intended for releasable application to the supporting surface at which there is intended to be supported the structure carried by the top side of the double-sided bonding self-adhesive tape to enable said double-sided bonding self-adhesive tape together with the structure supported by the top side of the tape to be removed from the supporting surface; and
    said two adhesive surfaces of said contact adhesive means being substantially aging-resistant and substantially resistant to softeners.

2. The double-sided bonding self-adhesive tape as defined in claim 1, wherein:
    said two sides of said woven supporting fabric possess unevenness; and
    said contact adhesive means being arranged at said woven supporting fabric in a manner so as to level-out said unevenness more strongly on one of said two sides than on the other.

3. The double-sided bonding self-adhesive tape as defined in claim 1, wherein:
    said woven supporting fabric is arranged outside a median plane of said double-sided bonding self-adhesive tape as viewed in cross-section of said double-sided bonding self-adhesive tape.

4. The double-sided bonding self-adhesive tape as defined in claim 1, wherein:
    said contact adhesive means comprises the same contact adhesive on both of said two sides of said woven supporting fabric.

5. The double-sided bonding self-adhesive tape as defined in claim 1, further including:
    an outer separating layer; and
    said one of said two sides of the double-sided bonding self-adhesive tape which possesses a greater adhesive capability being at least largely uninterruptedly and releasably engaged to said outer separating layer at said top side.

6. The double-sided bonding self-adhesive tape as defined in claim 5, wherein:
    said outer separating layer comprises paper.

7. A double-sided bonding self-adhesive tape comprising:
    a non-cleavable woven supporting fabric defining two sides;
    said non-cleavable woven supporting fabric possessing throughpassing apertures;
    contact adhesive means;
    said contact adhesive means being arranged on both of said two sides of said non-cleavable woven supporting fabric;
    said contact adhesive means arranged on one of said two sides of said non-cleavable woven supporting fabric defining a substantially continous self-adhesive coating possessing an outer substantially planar adhesive surface;
    said contact adhesive means arranged on the other one of said two sides of said non-cleavable woven supporting fabric defining a substantially continuous self-adhesive coating possessing an outer substantially non-planar structured adhesive surface which follows the structure of the non-cleavable woven supporting fabric;
    said two adhesive surfaces of said contact adhesive means being interconnected with one another through said throughpassing apertures of said woven supporting fabric;
    said contact adhesive means arranged on said one of said two sides of said non-cleavable woven supporting fabric defining said substantially continuous self-adhesive coating and possessing said outer substantially planar adhesive surface possessing a greater adhesive capability than said other one of said two sides of said non-cleavable woven supporting fabric to enable said one side to be attached to a structure intended to be releasably secured to a supporting surface;

said contact adhesive means arranged on said other one of said two sides of said non-cleavable woven supporting fabric and defining said substantially continous self-adhesive coating possessing said outer substantially non-planar structured adhesive surface which follows the structure of the non-cleavable woven supporting fabric possessing a lesser adhesive capability than said one side and being intended for releasable application to the supporting surface intended to secure the structure thereto so that said non-cleavable woven supporting fabric together with the structure can be removed from the supporting surface without any appreciable remnants of contact adhesive means adhering to said supporting surface; and said two adhesive surfaces being substantially aging-resistant and substantially resistant to softeners.

* * * * *

UNITED STATES PATENT AND TRADEMARK OFFICE
CERTIFICATE OF CORRECTION

PATENT NO. : 4,702,948
DATED : October 27, 1987
INVENTOR(S) : PAUL SIEBER-GADIENT It is certified that error appears in the above-identified patent and that said Letters Patent is hereby corrected as shown below:

Column 1, line 52, after "structure" please insert --or-- and after "covering" please delete "or"

Column 3, line 41, after "a" please insert --structure such as a--

Column 3, line 44, after "secured" please delete ";" (semi-colon) and insert --,-- (comma)

Signed and Sealed this

Twelfth Day of April, 1988

*Attest:*

DONALD J. QUIGG

*Attesting Officer*       *Commissioner of Patents and Trademarks*